(12) United States Patent
Bovet et al.

(10) Patent No.: US 8,349,113 B2
(45) Date of Patent: Jan. 8, 2013

(54) METHOD FOR STICKING A FILM ONTO A CURVED SUBSTRATE

(75) Inventors: Christian Bovet, Charenton le Pont (FR); Jean-Paul Cano, Charenton le Pont (FR); Paul Lefillastre, Charenton le Pont (FR); Antoine Marty, Toulouse (FR)

(73) Assignees: Essilor International (compagnie Generale d'optique), Charenton le Pont (FR); Centre National de la Recherche Scientifique—CNRS, Paris (FR)

( * ) Notice: Subject to any disclaimer, the term of this patent is extended or adjusted under 35 U.S.C. 154(b) by 369 days.

(21) Appl. No.: 12/669,824

(22) PCT Filed: Jul. 11, 2008

(86) PCT No.: PCT/EP2008/059096
§ 371 (c)(1),
(2), (4) Date: Jan. 20, 2010

(87) PCT Pub. No.: WO2009/021793
PCT Pub. Date: Feb. 19, 2009

(65) Prior Publication Data
US 2010/0193112 A1    Aug. 5, 2010

(30) Foreign Application Priority Data
Jul. 20, 2007  (FR) ...................................... 07 05282

(51) Int. Cl.
*B29C 63/16*   (2006.01)
*B29D 11/00*  (2006.01)

(52) U.S. Cl. .......................... 156/212; 156/230; 156/249
(58) Field of Classification Search .................. 156/212, 156/230, 241, 249, 382
See application file for complete search history.

(56) References Cited

U.S. PATENT DOCUMENTS

| | | | |
|---|---|---|---|
| 4,152,188 A * | 5/1979 | Friedrich et al. ............... | 156/212 |
| 4,242,162 A | 12/1980 | Edwards et al. | |
| 4,564,408 A | 1/1986 | Crumbach et al. | |
| 5,300,170 A * | 4/1994 | Donohoe ...................... | 156/235 |
| 2006/0006336 A1* | 1/2006 | Cano et al. .................... | 250/345 |
| 2008/0088044 A1 | 4/2008 | Cano et al. | |
| 2008/0314499 A1 | 12/2008 | Begon et al. | |
| 2009/0048399 A1 | 2/2009 | Reijntjens et al. | |

FOREIGN PATENT DOCUMENTS

| | | |
|---|---|---|
| EP | 0 128 802 | 12/1984 |
| WO | 2006/010414 | 2/2006 |
| WO | 2006/013250 | 2/2006 |
| WO | 2006/105999 | 10/2006 |
| WO | 2007/144308 | 6/2007 |

* cited by examiner

*Primary Examiner* — Barbara Musser
(74) *Attorney, Agent, or Firm* — Occhiuti Rohlicek & Tsao LLP

(57) ABSTRACT

A method sticks onto a curved surface of a substrate a functional film (4) that has a substantially planar initial shape. To this end, the film (4) is retained on a deformable membrane (1) by connecting means (2) that allow portions of said film to slip relative to the membrane when said membrane is deformed. This reduces stresses that are created in the film by the deformation. The method is adapted for applying a functional film to an ophthalmic lens.

20 Claims, 6 Drawing Sheets

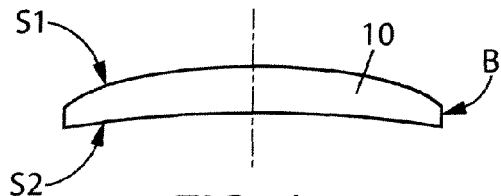
FIG. 1a
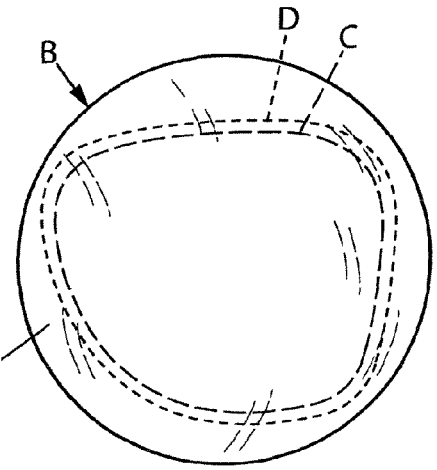
FIG. 1b
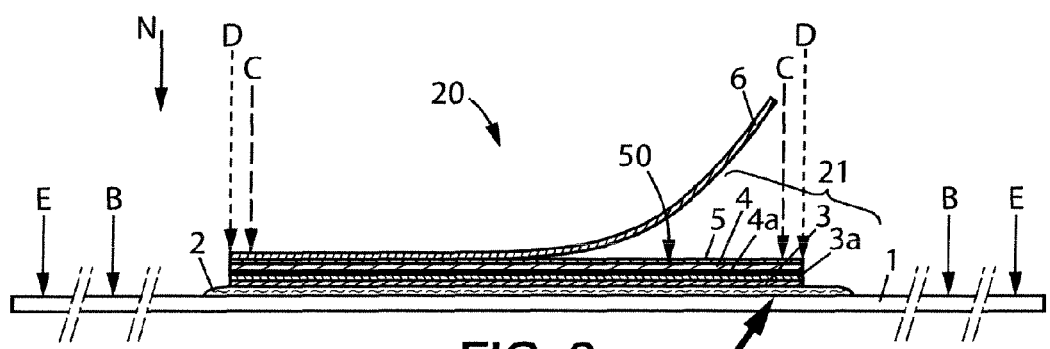
FIG. 2
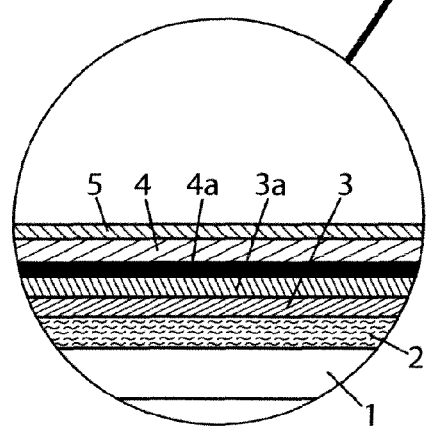

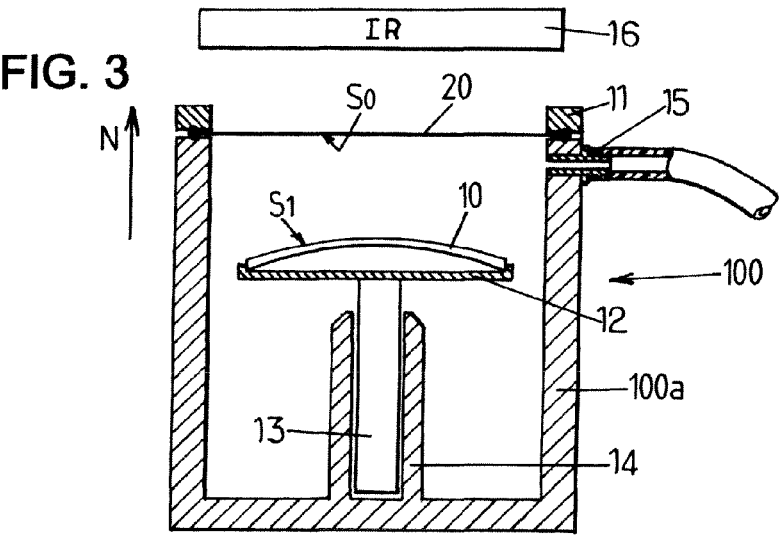
FIG. 3
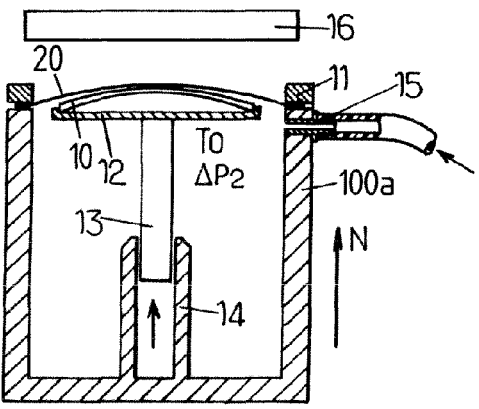
FIG. 4a   FIG. 4b
FIG. 4c   FIG. 4d

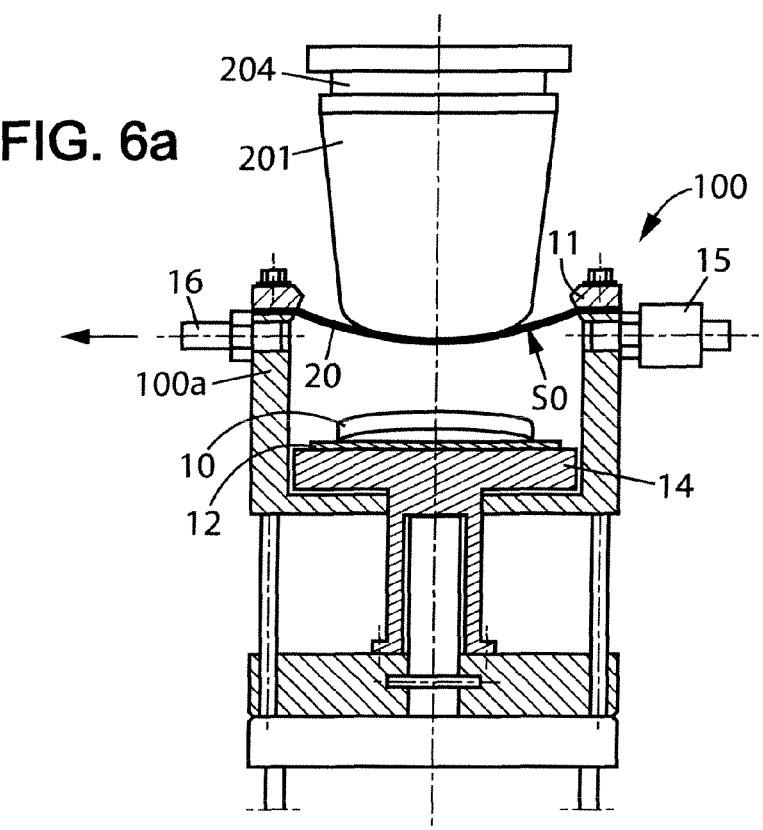
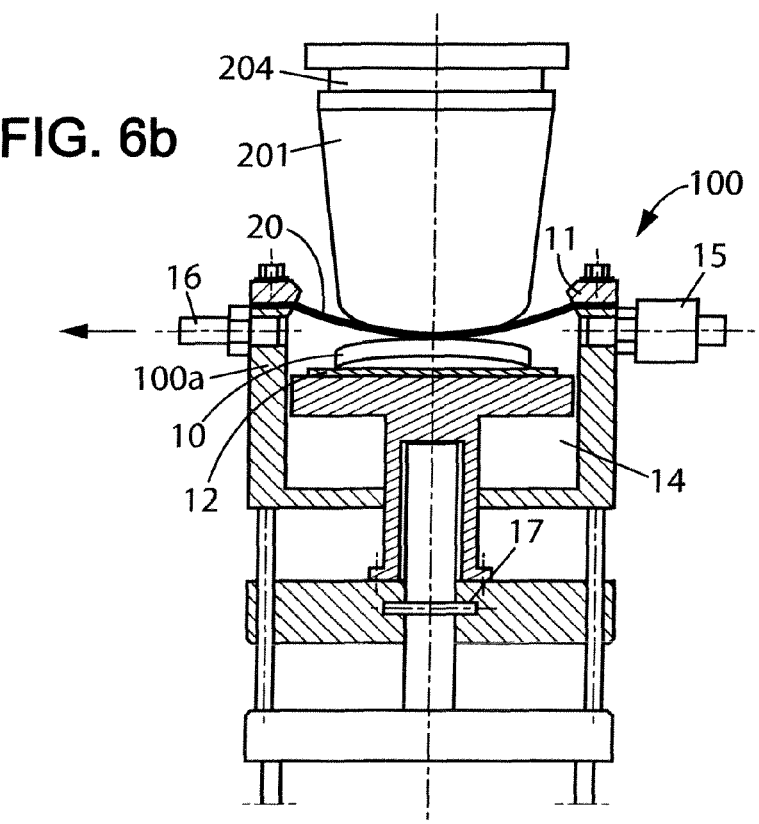

METHOD FOR STICKING A FILM ONTO A CURVED SUBSTRATE

CROSS-REFERENCE TO RELATED APPLICATIONS

This application is the National Stage of International Application No. PCT/EP2008/059096, filed on Jul. 11, 2008, which claims the priority of French Application No. 0705282, filed on Jul. 20, 2007. The content of these applications is hereby incorporated by reference in its entirety.

The present invention concerns a method for sticking a film onto a curved substrate. The present invention concerns more specifically a "low deformation" method for sticking a planar functional film, comprising one or more stacks of films with a continuous structure or a discontinuous structure or a combination of films with a continuous and discontinuous structure, onto a spherical or pseudo-spherical surface.

It is often useful to stick a film onto a curved face of an optical lens or an eyeglass lens to obtain a lens that has a required property. For example, the film may be a polarizing film, a contrast-enhancing film, a photochromic film, etc. Given that the face of the lens is curved, delamination, cracks and/or wrinkles appear in the film when it is applied to the face of the lens, because of the difference in curvature between that face and the film.

Such damage to the film is even more severe if the face of the substrate is not a surface that can be developed. At least one of the faces of a lens is a spherical or pseudo-spherical surface. In the context of the present invention, the expression "curved surface" means a pseudo-spherical surface, i.e. a convex or concave surface that has neither holes nor steps. Afocal, unifocal, bifocal, trifocal and progressive ophthalmic lenses all have at least one such pseudo-spherical face. Moreover, a spherical surface is a special case of a pseudo-spherical surface, for which the radii of curvature of the surface in two perpendicular directions are equal. The expression "pseudo-spherical surface" therefore includes the special case of spherical surfaces.

To prevent damage to the film, it is known to preform it, by conferring an appropriate initial curvature on it before applying it to the substrate. In particular, the film can be preformed by a thermoforming process. In this case, heating the film can make it more flexible so that the deformation of the film causes less damage to it. However, such preforming causes deformations of the film that are unfavourable and that may cause the functionality and/or cosmetics of the film to deteriorate.

Various implementation systems are known but none yields a satisfactory result. This is particularly true when the film adds a function to a substrate such as an ophthalmic lens. In this case, dioptric deterioration may occur in addition to the degraded functionality of the film and the appearance of cosmetic defects.

An object of the present invention is therefore to propose a new method for sticking a film onto a curved substrate in which the deformation of the film is reduced and generates fewer defects in the film.

This method is advantageously used to add a function to a substrate by means of a functional film as described hereinabove, including in particular an optical lens, and more particularly an ophthalmic lens, which may be a correcting or non-correcting lens. Said function may be provided on the internal and/or external face of said film and/or within the thickness of the film. Clearly in this context of use, the method must preserve the optical and even dioptric properties of said lens as well as its cosmetic properties in order to guarantee optimum optical transparency for an object of this kind with an added function, the purpose whereof is to correct or protect sight. Finally, this method must maintain the integrity of the function(s) in the functional film when it changes from a planar surface to a spherical or pseudo-spherical surface.

To this end, the invention proposes a method for sticking a functional film having a substantially planar initial shape onto a curved face of a substrate, which method comprises a deformation step during which the functional film is deformed and is retained on one face of a deformable auxiliary membrane by a connecting structure adapted so that the shape of the functional film varies in accordance with the deformation of the membrane, the functional film remaining parallel to the auxiliary membrane, only the auxiliary membrane being held by mechanical means at its perimeter, the functional film being held in contact with said auxiliary membrane only by said connecting structure. According to the invention, the connecting structure is adapted so that portions of the functional film can move locally relative to and parallel to the auxiliary membrane during the deformation step and movements of portions of the functional film relative to the membrane are free during the deformation step with no external action on the functional film or the membrane. Thus, slippage of the functional film on the membrane occurs in such a way as to minimize the stresses that are created in the functional film.

Because the film is not held anywhere at its periphery by mechanical means during the process, it can slip on the membrane when the deformation is generated, thus reducing deformation of the functional film caused by the deformation related to the change from a planar profile to a pseudo-spherical profile. The method of the invention is therefore characterized by the simultaneous existence, during spherical or pseudo-spherical deformation of the assembly comprising the auxiliary membrane, the film and the connecting structure:

of a phenomenon of slippage at the interface of the auxiliary membrane and the connecting structure;
and of a phenomenon of intimate and permanent retention of the assembly consisting of the connecting structure and the functional film against the auxiliary membrane; this intimate holding forces accommodation to the deformation of the functional film relative to the deformation induced in the auxiliary membrane.

The simultaneous existence of these two phenomena during the deformation enables the functional film:
on the one hand, to adapt to the spherical or pseudo-spherical profile imposed on the assembly—auxiliary membrane, connecting structure, film—thanks to the retaining effect of the adhesion force or capillary force that joins it to the connecting structure, and
on the other hand, to be subject to deformation very much less than and decoupled from that of the auxiliary membrane, thanks to the phenomenon of slippage allowed between the auxiliary membrane and the connecting structure.

This reduces the defects generated in the functional film when it is applied onto the substrate using a method of the invention. In particular, it is compatible with an optical function of the substrate provided with the functional film, in particular if the substrate is a lens. It is also compatible with an application that has cosmetic requirements, such as an ophthalmic application.

In the context of the invention, the connecting structure between the functional film and the deformable auxiliary membrane comprises a capillary liquid layer or a visco-elastic adhesive material layer. The connecting structure of the invention therefore has a triple role:

it provides the intimate retention between its internal face and the functional film;

it allows optimized sliding between its external face and the deformable auxiliary membrane in the case of a connection provided by a capillary liquid layer, or optimized flow in the case of a connection provided by a visco-elastic adhesive material layer;

it reduces coupling in shear between the auxiliary membrane and the functional film to be stuck and therefore limits deformation within the functional film.

In the context of the method of the invention the deformable auxiliary membrane serves as a forming die.

The auxiliary membrane must be larger than the functional film so that a peripheral edge of the functional film is inside a peripheral edge of the membrane during the deformation step. This guarantees that the auxiliary membrane is held at its perimeter by mechanical means disposed within the device for implementing the method of the invention. Thus the diameter of the auxiliary membrane is greater than the greatest dimension of the functional film to be stuck onto the substrate.

For this reason in particular, if the substrate comprises an ophthalmic lens that is to be assembled into an eyeglass frame, the functional film is advantageously cut substantially to the measurements of a lens housing in the frame before the deformation step. This also leads to material savings for the functional film relative to a functional film that would be applied onto an ophthalmic lens blank and would have the latter's dimensions.

The mechanical properties of the auxiliary membrane are also important for limiting deformation of the functional film. There must be corroboration between the mechanical properties of the functional film and those of the auxiliary membrane. Thus for minimum deformation of the functional film, the first object of the invention, it is necessary for the auxiliary membrane to have a "stiffness" greater than or equal to that of the functional film. To form the functional film to shape, it is necessary for the auxiliary membrane to be sufficiently mechanically rigid relative to said functional film for the latter to be forced to adapt to the geometrical profile that the auxiliary membrane imposes without distortion occurring within that auxiliary membrane. In the context of the invention, the stiffness of the auxiliary membrane is an appropriate combination of the Young's modulus and the thickness of the membrane.

Advantageously, although this is not essential for implementing the invention, the connecting structure may further include an intermediate film that is fixed relative to the functional film during the deformation step and that may be adapted for separating, after the deformation step, the deformable auxiliary membrane, on the one hand, from an assembly comprising the functional film and the intermediate film, on the other hand. During the deformation step, portions of the intermediate film can therefore be moved locally relative to and parallel to the membrane, being entrained by the functional film. This kind of intermediate film may be separated from the functional film afterwards, for example peeled off. The main function of this intermediate film is to facilitate separation of the functional film from the connecting structure without interfering with the physical and functional properties of the functional film itself. This film may in particular be laminated directly onto the functional film at a certain temperature in order to protect it prior to its use in the method of sticking by forming. It may also be retained on the functional film after the latter has been stuck to the substrate in order to protect it from any external attack until final use of the product.

In the context of implementation of the method of the invention, the step of deformation of the auxiliary membrane with the functional film is part of a step of preforming the functional film that is executed before applying the film to the substrate. Applying the film onto the substrate in the context of the invention terminates in sticking of the two entities (when the functional film is smaller than the substrate). In this context, the functional film may be applied to the substrate by arranging a portion of a bonding agent between them, so that the functional film is stuck to the substrate at the end of the process. Where appropriate, the bonding agent portion may be a specific layer that is initially present on the functional film, on the opposite side thereof to the means of connection to the membrane.

Other features and advantages of the present invention will become apparent in the course of the following description of nonlimiting embodiments, which is given with reference to the appended drawings, in which:

FIGS. 1a and 1b are respectively a top-view and a cross-sectional view of a substrate used to implement the invention;

FIG. 2 is a view in section of a structure used to implement the invention;

FIGS. 3 and 4a-4d illustrate a first embodiment of the invention;

FIGS. 5 and 6a-6c illustrate a second embodiment of the invention,

Figure 5:
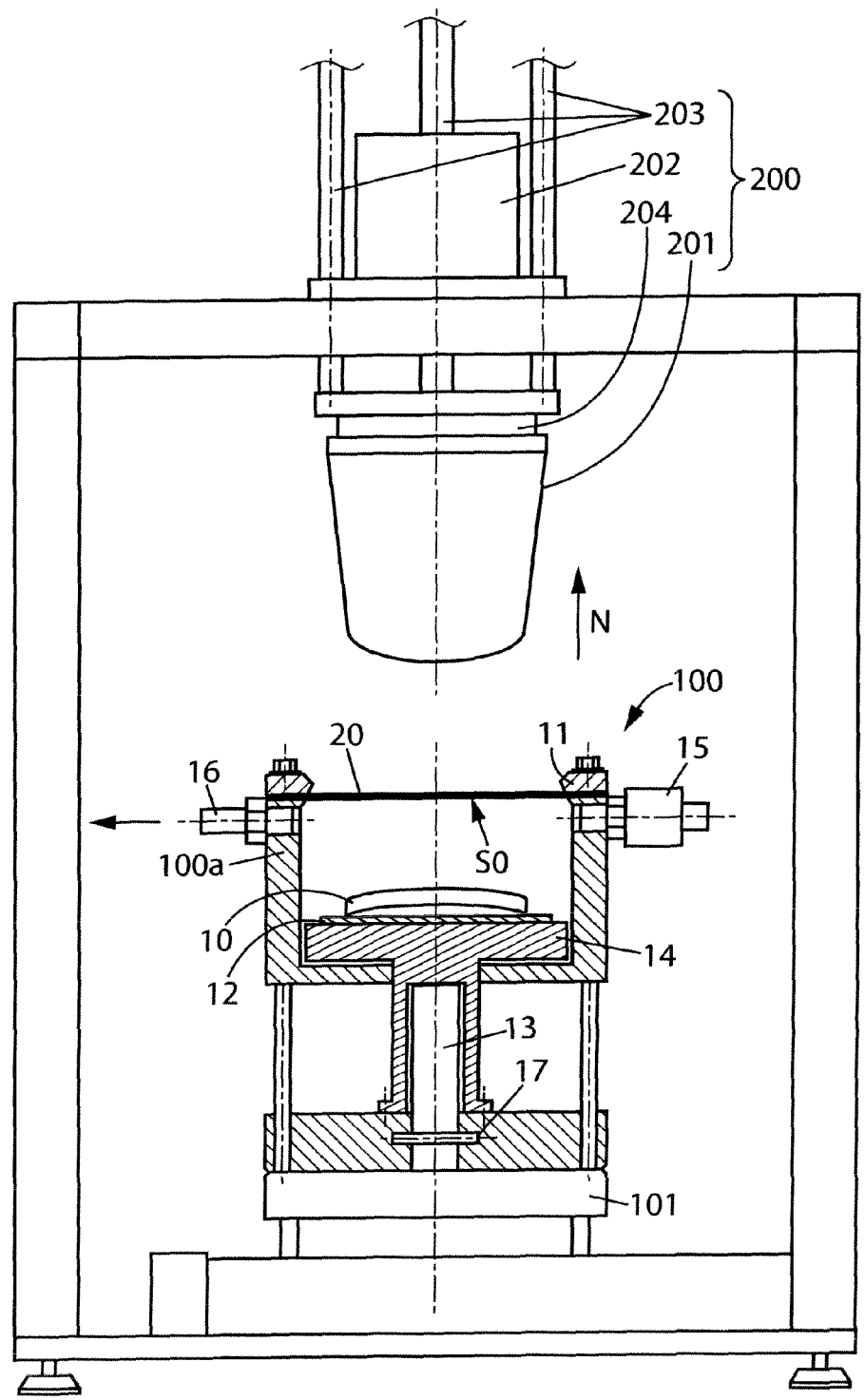
Figure 6C:
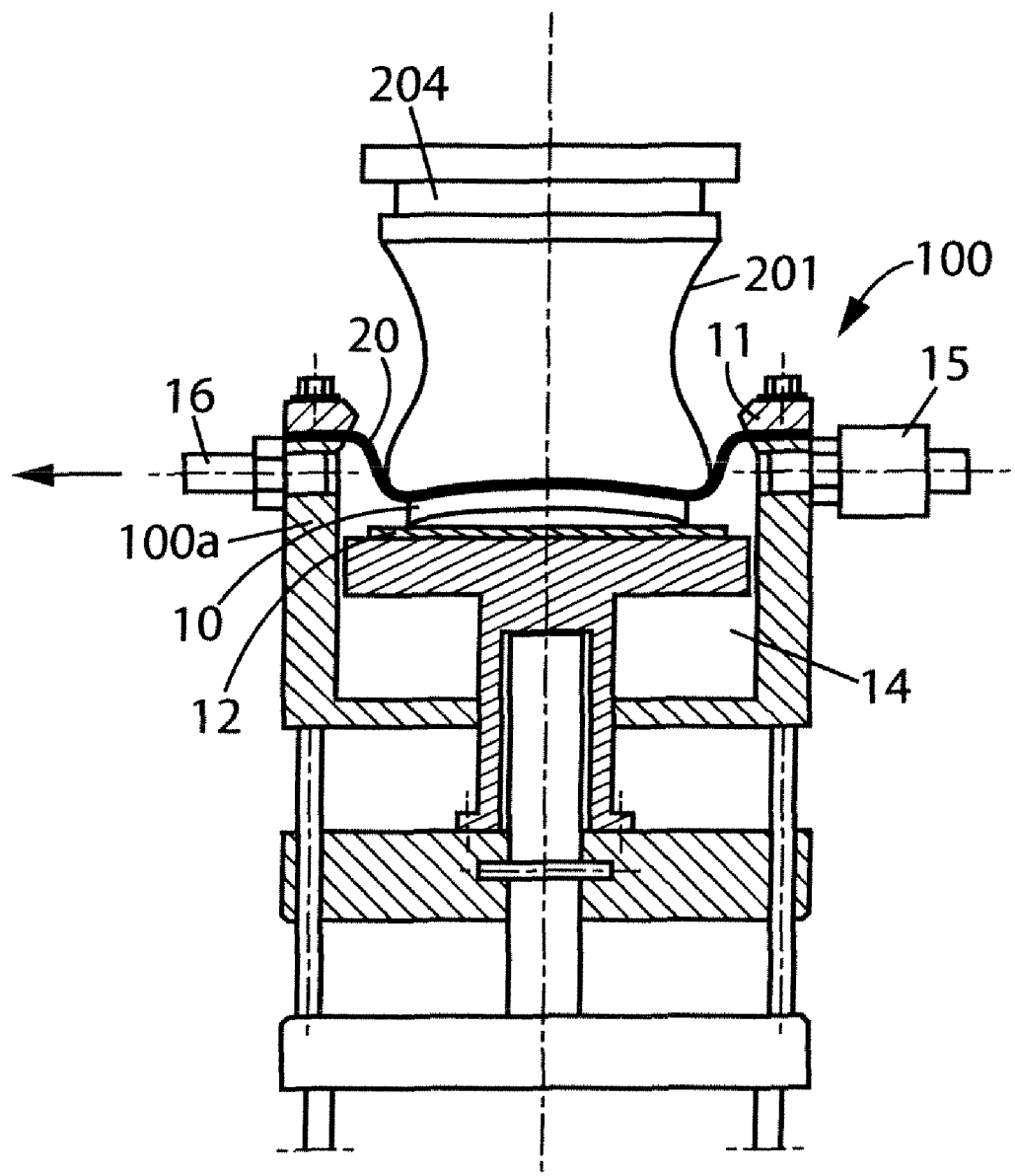

For clarity sake, the elements that are represented in the figures are not reproduced in relation to actual dimensions or actual ratios of dimensions. Moreover, identical references in different figures denote elements that are identical or have identical functions.

According to FIGS. 1a and 1b, a substrate consists of an ophthalmic lens 10. This kind of lens has an front surface S1 that is convex and a back surface S2 that is concave. On completion of its fabrication process by casting or by injection moulding, the ophthalmic lens generally and preferably has a circular peripheral edge, for example of 6.5 cm (centimeter) diameter, denoted B. In FIG. 1b, the reference C indicates the trimmed contour of the lens 10, which corresponds to the final shape of the lens ready to be assembled into the housing of the frame of a pair of eyeglasses. The lens 10 may consist of any rigid material routinely used in the ophthalmic field. In particular, it can be of a mineral, organic or composite material. By way of nonlimiting example, the materials are chosen from polycarbonates; polyamides; polyimides; polysulfones; copolymers of polyethylneterephthalate and polycarbonate; polyolefins, in particular polynorbornenes; polymers and copolymers of diethylene glycol bis(allylcarbonate); (meth)acrylic polymers and copolymers, in particular (meth)acrylic polymers and copolymers derived from bisphenol-A; thio(meth)acrylic polymers and copolymers; urethane and thiourethane polymers and copolymers; epoxy polymers and copolymers; and episulfide polymers and copolymers.

It is understood that here an ophthalmic lens is merely taken as an example for the substrate, but that the invention can be used with other substrates to a pseudo-spherical face of each of which a film must be applied.

According to FIG. 2, a multilayer structure 20 comprises an auxiliary membrane 1 and a functional film 4 which are connected to each other by a temporary connecting structure.

The multilayer structure 20 has a planar initial shape, so that it can be produced simply, in particular in large sheets, by standard lamination and/or coating methods, for example. Its production cost is therefore low.

The membrane 1 is intended to support the film 4 when the latter is to be deformed. It is then deformed at the same time as the film, possibly being heated beforehand. To this end, it consists of a deformable material that can be based on polyethylene terephthalate (PET), polyethylene naphthalate (PEN), polycarbonate (PC), polyethersulfone (PES), polyarylate (PAR), polyvinyl alcohol (PVA), polycyclic olefin (PCO), polyamide (PA), polyurethane (PU) or polyimide (PI), although this list is not limiting on the invention. The membrane 1 may be a single homogeneous film or may itself have a laminated structure comprising a plurality of layers. The membrane 1 preferably consists of a single homogeneous layer of polyethylene terephthalate. The auxiliary membrane 1 has a product of its Young's modulus (E1) by its thickness (e1) greater than or equal to the product of the Young's modulus (E4) by the thickness (e4) of the functional film 4. The more compliant the connecting structure, the closer the absolute value of the product $E1 \cdot e1$ to that of the product $E4 \cdot e4$.

The film 4 is intended to confer a particular function to the lens 10 when it is stuck onto it. This function may be provided by the material of the film itself or by at least one layer of the film. In the latter case, the functional film 4 comprises a base film and one or more functional layers carried by the base film. In the context of the invention, the term "function" refers to a structural, optical, physical or physical-chemical function. This kind of function may include a function of protection against photodegradation or photo-oxidation, an anti-impact function, an anti-scratching function, an anti-reflective function, a polarizing function, a colour filter function, a photochromic function, an anti-static function, an anti-soiling function, a function provided by a complex pixellated or microstructured structure. The expression "pixellated or microstructured structure" refers in particular to a cellular structure made up of cells that are juxtaposed parallel to one face of the film and/or the substrate. Such films are described in particular in patent applications WO 2006/013250 and WO 2007/010414. The latter are in particular able to embody a number of functions within their composition. For an optical or ophthalmic application the functional film 4 is transparent, although it can be tinted.

Some of these layers must be exposed to the outside in the finished lens, relative to the base film, as is known in the art. In FIG. 2, one or more of these layers are indicated by the reference 4a, and are situated on the face of the functional film 4 that faces towards the auxiliary membrane 1. The connecting structure 2 that temporarily holds the film 4 onto the membrane 1 is such that the shape of the membrane 1 is transmitted to the film 4, with the film 4 held intimately and permanently in contact with the membrane 1 via said connecting structure. Moreover, no portions of the film 4 are rigidly fixed to the membrane 1, but can move relative to it, at least within a limited range, while remaining parallel to it. Thus when the membrane 1 and the film 4 are curved, i.e. are formed to a pseudo-spherical profile substantially corresponding to that of the substrate, edge portions of the film 4 can slip on the surface of the auxiliary membrane 1 via the connecting structure 2.

For this purpose, the connecting structure 2 may be of different kinds and have various compositions. A first possibility is for the film 4 to be held onto the membrane 1 by a connecting structure 2 comprising a layer of liquid, by virtue of the capillarity of the liquid. In the context of the invention the term "liquid" refers to a material state in which the material has sufficient mobility to flow under its own weight. A liquid is chosen whose boiling point is higher than the temperature at which sticking is executed. The liquid is advantageously an oil.

Another possibility is for the film 4 to be held onto the membrane 1 by a connecting structure comprising a layer of an adhesive material that remains visco-elastic. In this case, local flow of the adhesive material allows facing portions of the film 4 and the membrane 1 to move relative to each other, remaining parallel. The thickness of this kind of adhesive material layer is simple to adjust, in particular as a function of the viscosity characteristics of the adhesive material. In this second case, to minimize the deformation of the functional film 4, it is necessary to ensure the best compliance of this connecting structure comprising this kind of visco-elastic adhesive material. The term "compliance" refers to the ability of this connecting structure to be deformed in shear, which property is linked to the "structure thickness/shear modulus" ratio. This compliance may in particular be achieved by using a very ductile visco-elastic adhesive material.

Figure 7A:
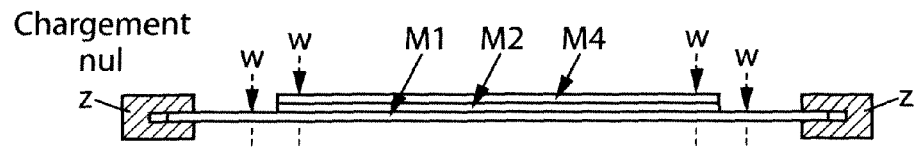
FIGS. 7a to 7d illustrate a test device able to establish the compliance of the connecting structure for a predetermined auxiliary membrane—functional film pair.
Figure 7B:
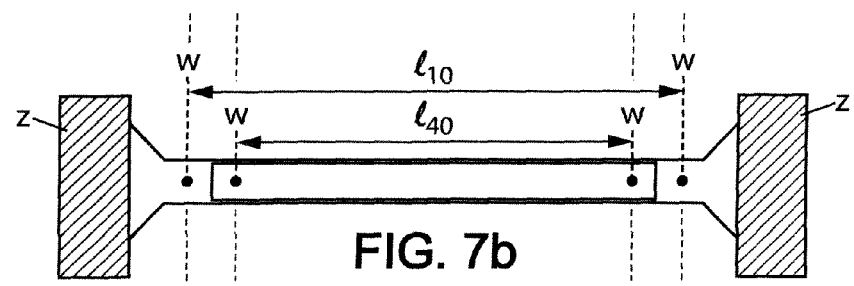
Figure 7C:
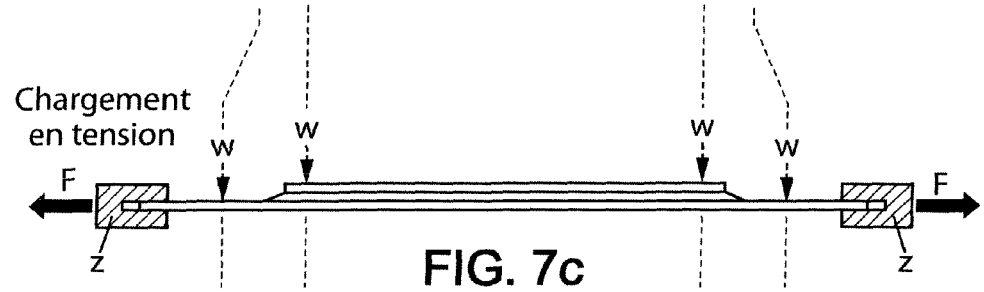
Figure 7D:
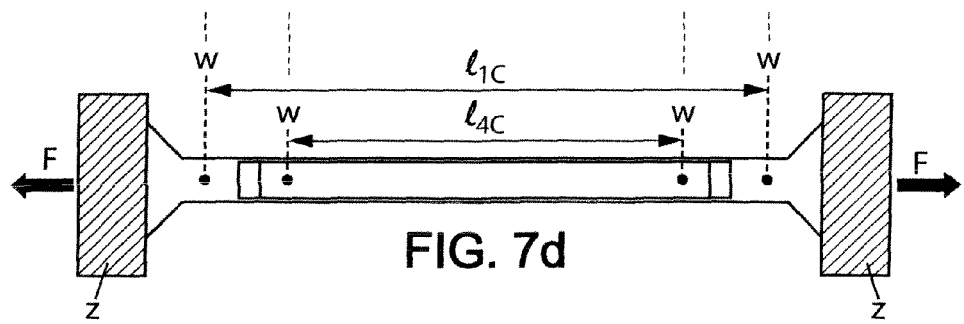

Many visco-elastic adhesive materials may be used. The choice of this material, and its thickness, can be guided by preliminary tests based on specific samples designed to characterize the compliance of the connecting structure inserted between the auxiliary membrane 1 and the functional film 4, under loading conditions close to those that the stack (auxiliary membrane, connecting structure and functional film) is subjected to during the (thermo)forming process that is the subject-matter of this invention. According to FIGS. 7a to 7d, the samples comprise the stacked three elements of the process, namely the auxiliary member 1, the connecting structure 2 and the functional film 4. In these samples appropriate for the test, each constituting element of the stack comprises a strip of material M1, M2 and M4, respectively representing the material that is used for the auxiliary membrane 1, the material that is used for the connecting structure 2, and the material that is used for the functional film 4. These constituting elements in the form of strips are arranged so that the strip M1 can be tensioned along the axis of the longitudinal dimension by means of clamps "z", and the elements M2 and M4, shorter in length than the strip M1 and therefore set back and outside the grip of the clamps "z", remain in intimate contact with the strip M1. At the ends of the strips M1 and M4 are four markers "w". With no load, i.e. in the absence of any tension apart from that exerted by gravity perpendicularly to the longitudinal axis of said strips, the distance between the markers are the lengths $l_{10}$ and $l_{40}$ (see FIGS. 7a and 7b, which are respectively a lateral view and a plan view of the test device). Progressive loading in tension is effected under dynamic F, kinetic and thermal operating conditions as close as possible to those of the (thermo)forming process proper in which the selected functional film 4 is to be used. The effect of loading in tension during the deformation phase is for the strip M1, imaging the auxiliary membrane 1, to be stretched and, thanks to the intimate connection, to drive the strip M2, imaging the connecting structure 2. Concomitantly, the strip M2 tends to drive the strip M4, imaging the functional film 4. The system reaches equilibrium when, by reaction and together, the stresses in tension in the strip M1, the strip M2 and the strip M4 rigorously oppose the loading tension F. The forces present induce shearing of the intermediate layer consisting of the connecting structure and, as indicated hereinabove, it is the compliance of this connecting structure (in other words its ability to be deformed when stressed in shear) that imposes the deformation of the functional film 4. After loading to simulate the tensioning of the stack during the forming step of the method, the markers are separated by the lengths $l_{1C}$ and $l_{4C}$ (see FIGS. 7c and 7d). The respective displacements $l_{1C}-l_{10}$ and $l_{4C}-l_{40}$ in the portion of the sample corresponding to the auxiliary membrane M1 and the portion of the sample corresponding to the functional film M4 can be measured by various methods well known to the person skilled in the art, for example optical extensiometry. The pertinent parameter looked for that qualifies the connecting structure M2 (sufficient compliance or not), for a given pair of structures M1-M4, is the ratio between the relative deformation measured on M4 and the relative deformation measured on M1, that is to say the result of $(l_{4C}-l_{40}) \times l_{10}/(l_{1C}-l_{10}) \times l_{40}$. That ratio tends towards zero if the very good slippage properties of an "oil" type liquid connecting structure, for example, are exploited, and increases with the shear modulus of the material that constitutes M2 and/or with the reciprocal of the thickness of M2 when the apparent slippage is the result of the visco-elastic flow mechanism characteristic of adhesive materials. A threshold value of this ratio of the order of 1/100 is a good criterion of choice for qualifying the nature and the thickness of the connecting structure 2. This threshold value of 1/100 corresponds to 0.1% deformation of the functional film with 10% deformation of the auxiliary membrane. Accordingly, in the context of the invention, the preferred choice is a connecting structure 2 such that the ratio $(l_{4C}-l_{40}) \times l_{10}/(l_{1C}-l_{10}) \times l_{40}$ is at most equal to 0.01 (1/100) for a chosen auxiliary membrane 1/functional film 4 pair ready for forming by the method of the invention, the values of $l_{10}$, $l_{40}$, $l_{1C}$ and $l_{4C}$ being determined under the conditions of the test described hereinabove and using the device from FIGS. 7a to 7d.

A pressure sensitive adhesive (PSA) based on polyacrylate is preferably used to implement the invention.

The structure 2 connecting the functional film 4 to the auxiliary membrane 1 may optionally also include a supplementary film 3 called the intermediate film. The film 3 is between the functional film 4 and the connecting layer 2. It is fixed rigidly to the film 4 or to a thin layer 4a carried by it. To this end, a layer 3a of an adhesive material, in particular a pressure-sensitive adhesive material, may be disposed between the functional film 4 and the intermediate film 3. The adhesion force of the layer 3 is preferably greater than that of the connecting layer 2, so that when the membrane and the functional film 4 are separated from each other, starting from one edge, it is the connecting layer 2 that gives way. The intermediate film 3 may be separated afterwards by peeling the film 4, as a result of the layer 3a giving way. As described hereinabove, the main function of this intermediate film 3 is to protect the functional film 4 and in particular to allow its separation at the end of the process from the connecting structure 2 and the auxiliary membrane 1, without degrading the function provided by said functional film. This intermediate film is chosen so that it is easy to remove by peeling it off at the end of the sticking process, when the lens 10 is finally finished.

Finally, the structure 20 may further include a supplementary layer 5 of a bonding agent for sticking the film 4 to one of the faces of the lens 10. To this end, the layer 5 is arranged on the film 4, on a side of the latter opposite the connecting structure 2. For the application to an ophthalmic lens that is described here, the layer 5 is transparent and is adapted to fix the film 4 permanently to the lens 10. It can therefore be, in particular, a glue that is cross-linked by heating it or by irradiating it with ultraviolet light, or a pressure-sensitive adhesive. Before being applied to the lens 10, the bonding agent layer 5 may be temporarily protected by a peel-off film 6. A film 6 of this kind is then arranged on the layer 5, on a side of the latter opposite the functional film 4. It may be removed either before or after the membrane 1 is deformed with the functional film 4. This kind of peel-off film is used in particular when, in a preferred embodiment of the invention, the bonding agent is a pressure-sensitive adhesive. In another embodiment of the invention that is not shown here, the bonding agent may be deposited directly onto the lens 10 before execution of the method of the invention.

The membrane 1 is larger than the face of the lens 10 to which the film 4 must be applied. Thus the membrane 1 can cover the lens 10 completely, being held by its own peripheral edge E, outboard of the edge B of the lens.

The functional film 4 is preferably also cut beforehand to the dimensions of the final ophthalmic lens, when it is present in the FIG. 2 structure 20, ready to be used. The expression "cut to the dimensions of the lens" means that the film 4 is slightly larger than the lens when trimmed, i.e. it has a peripheral edge D that is outside the contour C when the film 4 is applied to the lens 10 (see FIG. 1b). In a preferred embodiment of the invention, after deformation, the film 4 has a shape identical to the trimmed lens, i.e. the peripheral edge of the functional film 4 exactly matches the contour C of the trimmed lens. Such reduction of the size of the film 4 to the dimensions of the trimmed lens, which is effected before applying the film 4 to the lens 10, significantly reduces the stresses that are created in the film 4 when it is deformed, in particular because of the use by the method of the invention of a connecting structure having the characteristics described hereinabove. It is furthermore possible to cut the film 4 directly to the dimensions of the trimmed lens in a mass-produced sheet of the film. This avoids wastage of the material of the film 4, which helps to reduce the unit cost of the final lens.

Thus the membrane 1 is larger than the functional film 4, and so the peripheral edge D of the film 4 is situated inside the edge E of the membrane 1. In particular, in an advantageous embodiment of the invention using an auxiliary membrane 1 of circular geometry, the diameter of said membrane is greater than the greatest dimension of the functional film 4 to be stuck. The edges B, C, D and E are indicated in FIG. 2, which shows their relative positions. The edge D of the functional film 4 also preferably coincides exactly with the interior of the edge C of the trimmed lens 10 exactly according to the geometry of an eyeglass lens ready to be fitted to a frame, when the film is applied to the latter.

The membrane 1 preferably has a mechanical strength vis à vis deformation that is greater than the mechanical strength of the functional film 4 subject to the same deformation. In this way, when the structure 20 is deformed as a whole, the stresses that are created in the structure when it is deformed are created primarily within the membrane 1. The residual stresses that appear in the film 4 are therefore low, which further reduces the defects liable to appear in the film 4.

A first method for applying the structure 20 from FIG. 2 to the lens 10 from FIGS. 1a and 1b is described next with reference to FIGS. 3 and 4a-4d. In this method, the structure 20 is deformed during a preforming step by creating a pneumatic pressure difference between the two faces of the membrane 1. It is then stuck to the lens 10.

As shown in FIG. 3, an enclosure 100, for example of vertical axis cylindrical shape, is open on its upper face. A lateral wall 100a of the enclosure 100 is provided at its upper end with a system for fixing the structure 20, to seal the enclosure 100. This fixing system includes sealing means such as, for example, an O-ring that is intended to be compressed by a fixing ring 11 between the lateral wall 100a and a peripheral edge of the auxiliary membrane 1 of the structure 20, using clamping screws that are not shown.

A lens support 12 able to hold any geometry of a lens 10 is disposed in the enclosure 100 at the end of a cylinder 13. The cylinder 13 is combined with a piston 14 to raise the support 12 into the interior of the enclosure 100, beyond the level of the fixing ring 11. The movement of the support 12 by the cylinder 13 and the piston 14 is controlled from outside the enclosure 100, for example electrically or hydraulically. It is assumed that this kind of remote control is known and it is not described again here.

The enclosure 100 has an orifice 15 that is connected by an appropriate pipe to an external gas source (not shown). That source enables a controlled pneumatic pressure to be established within the enclosure 100. Thus the pressure inside the enclosure 100 can be increased or decreased relative to ambient pressure outside the enclosure 100. The pressure in the enclosure 100 can be varied and controlled independently of the position and the movement of the support 12. In other words, the pressure in the enclosure 100 and the position of the support 12 are adjusted by separate control means.

Finally, a heating system 16 is arranged above the enclosure 100, facing the enclosure closing means, which consist in the context of the invention of the structure 20. A radiative infrared heating system enables particularly simple and fast use, but other heating systems can be used instead.

The heating system 16, the pressure inside the enclosure 100 and the position of the support 12 are advantageously controlled by a programmable automatic controller for executing a sequence of variations of the various parameters of the device to carry out sticking in accordance with the invention.

The lens 10 trimmed to the geometry of an eyeglass lens ready to be mounted on a defined frame is installed on the support 12 with the face S1 facing upward. The support 12 is then moved to a low position in the interior of the enclosure 100.

The film 6 protecting the structure 20 is removed to expose the bonding agent layer 5. The structure 20 is fixed to the enclosure 100 by means of the auxiliary membrane 1 and the ring 11, with the face S0 of the functional film 4 that carries the sticking agent layer 5 facing the interior of the enclosure, in conformance with the oriented direction N that is indicated in FIG. 2 (oriented downward in FIG. 2) and FIG. 3 (oriented upward in FIG. 3). In this configuration, the face S1 of the lens 10 is at a distance below the face S0 of the functional film 4 and the enclosure 100 is hermetically sealed by the auxiliary membrane 1. In this configuration of use of the device, the functional film 4 is not held onto the enclosure 100 by the fixing ring 11.

During a first step, the pressure inside the enclosure 100 is increased, to create a pneumatic pressure difference $\Delta P_1$ between the two sides of the structure 20 which is between 0.1 bar and 4.0 bars, preferably between 0.1 bar and 1.0 bar. The pressure outside the enclosure 100 is atmospheric pressure and the enclosure 100 is at raised pressure. During this step, the structure 20 is heated by means of the system 16, to make it more flexible, more plastic and more extensible. The temperature $T_1$ of the structure 20 is then between 80° C. and 180° C. It may be advantageous to heat the structure 20 before increasing the pressure in the enclosure 100 and to continue with the heating to maintain the temperature of the structure 20 while the pressure in the enclosure 100 is increased. The structure then assumes a substantially spherical shape by expanding towards the exterior of the enclosure 100, as shown in FIG. 4a.

The heating of the structure 20 is then stopped and the temperature of the structure 20 is brought to a value substantially equal to the ambient temperature $T_0$, which is between 10° C. and 40° C. The pressure inside the enclosure 100 may be reduced during a second step, to obtain a pneumatic pressure difference $\Delta P_2$ between the two sides of the structure 20. In the case of transferring a small area, sticking is preferably effected at the deformation pressure: the film 4 not being stressed by an elastic component, there is no need to reduce the pressure during the sticking step. The sticking pressure is between the forming pressure $\Delta P_1$ and 0.05 bar. The enclosure 100 is therefore pressurized continuously. Because of partially elastic behaviour of the membrane 1, the expansion of the structure 20 towards the exterior of the enclosure 100 is reduced. The raised pressure value $\Delta P_2$ is selected so that the curvature of the functional film 4 becomes slightly less than the curvature of the convex face S1 of the lens 10 (FIG. 4b). These first and second steps constitute preforming of the film 4 to a curvature value that is between the initially zero curvature of the film 4 and the curvature of the face S1 of the lens 10. In this case, this preforming is effected by a thermoforming process.

During a third step, the support 12 is raised so that the face S1 of the lens 10 comes into contact with the bonding agent layer 5 that is present on the face S0 of the film 4. Because of the respective curvatures of the two faces S0 and S1, contact occurs first at the centre of the lens 10 (FIG. 4c) and then expands radially as the support 12 continues to rise. The face S1 of the lens 10 then pushes the structure 20 towards the outside of the enclosure 100, beyond the position of the film before raising the support 12. The face S1 of the lens 10 is therefore progressively pressed against the face S0 of the film 4, with a speed of relative movement that can be between 0.1 and 1.0 mm/s. An upper limit value of this speed depends on the plastic behaviour of the structure 20. In this way, the film 4 assumes the shape of the face S1, without creasing or tearing (FIG. 4d) and with minimum deformation. During this third step, the temperature of the film is constant, for example remaining equal to the ambient temperature.

The lens 10 may be held pressed against the film 4 for a waiting time that can be between 0.5 second and 2 minutes. The pressurization of the enclosure 100 is then terminated, the support 12 is lowered, and the fixing ring 11 is removed. The lens 10 is then recovered with the structure 20 stuck to the face S1. If the layer 5 consists of a polymerizable glue, the lens 10 and the structure 20 are exposed to UV radiation or to a flow of heat, to fix the sticking permanently. Where applicable, this exposure step may be carried out before removing the lens 10 and the structure 20 from the enclosure 100, with the increased pressure $\Delta P_2$ still applied.

The auxiliary membrane 1 is then separated from the lens 10, causing the connecting layer 2 to rupture. Such separation can be performed by peeling, for example. The assembly 21 consisting of the intermediate film 3, the adhesive material layer 3a, the functional film 4 and the bonding agent layer 5 is then attached to the lens 10.

If the functional film 4 has a peripheral edge D greater than the peripheral edge C of the trimmed lens 10, it is then cut in order to have a peripheral edge identical to the peripheral edge C. Finally, the intermediate film 3 may be peeled off in turn to furnish an ophthalmic lens ready for use.

The invention has been implemented under the following particular conditions:

the face S1 of the lens 10 is spherical with a radius of curvature of 68 mm and a diameter of 65 mm;

the membrane 1 is of polyethylene terephthalate (PET) 75 μm thick;

the functional film 4 consists of a basic film of cellulose triacetate (CTA) 80 μm (micrometers) thick, carrying a coating made up of layers 4a with the dual function of mechanical protection and anti-reflection;

the connecting layer 2 is a layer of pressure-sensitive adhesive (PSA) 25 µm thick;

the intermediate film 3 is of polyvinyl chloride (PVC) and is fixed to the film 4 by a precoated layer of pressure-sensitive adhesive (PSA), with a total thickness of 70 µm; and the intermediate film has been reduced beforehand to the following dimensions of an ophthalmic lens: width 32 mm, length 55 mm, and larger diagonal 58 mm.

During the application process described with reference to FIGS. 3 and 4a-4d, the foregoing structure 20 was preformed by heating it to 120° C. for 30 seconds and then raising the pressure by 0.9 bar in the enclosure 100, at the same time as continuing to heat the structure 20.

Under these conditions, the deformation of the film 4 is maximum at the centre, with a value that is of the order of 1%. That value is five to ten times less than the deformation of the auxiliary membrane 1 at the centre.

FIGS. 5 and 6a-6c show another method of the invention for applying the functional film 4 onto the lens 10, during which the membrane is deformed by pressing a buffer pad against the membrane on a side opposite the functional film 4.

A device as shown in FIG. 5 may be used for this. This kind of device comprises a low-pressure enclosure 100 and an applicator system 200 that is held above the enclosure by means of a rigid structure.

The low-pressure enclosure 100 has a lateral wall 100a that is again a vertical axis cylinder. It is fitted with the clamping ring 11, to fix the structure 20 to the upper peripheral edge of the wall 100a. The enclosure 100 is therefore hermetically sealed at the top. It is disposed above a base 101, at a fixed height. A vertical axis cylinder 13 and a piston 14 that passes through the lower face of the enclosure 100 move the support 12 vertically inside the enclosure 100. An immobilizer system 17 sets the height of the support 12, and the wall 100a includes the gas inlet orifice 15 and an aspiration orifice 16. The orifice 16 is connected to a pumping unit, not shown.

The application system 200 comprises a buffer pad 201 that is mounted on vertical slides 203 and which can be moved by means of a displacement system 202. This kind of displacement system may comprise a stepper motor that drives a lead screw, for example. A pressure sensor 204, which may comprise a piezo-electric element, measures the force of application of the buffer pad 201 against the structure 20.

The structure 20 is again fixed by the auxiliary membrane 1 to the enclosure 100 by means of the ring 11. It is again oriented so that the face S0 of the functional film 4 faces towards the interior of the enclosure 100, in the oriented vertical direction N that is indicated in FIGS. 2 and 5. At this stage, if the structure 20 includes a protective film 6, the latter film is removed to uncover the bonding agent layer 5.

The lens 10 is fixed to the support 12 so that its face S1 is again oriented upward. The piston 14 is in the lowered position so that the lens 10 and the structure 20 are at a distance from each other.

The structure 20 may then be applied to the lens 10 by moving the structure 20 and the lens 10 towards each other in stages.

In a first stage (FIG. 6a), the buffer pad 201 is lowered to push a central portion of the structure 20 towards the interior of the enclosure 100. Given that the structure 20 is held firmly at its periphery by the auxiliary membrane 1 and the ring 11, it is deformed and assumes a curved shape, which corresponds to that of the lower end of the buffer pad 201. This first stage constitutes preforming of the structure 20 so that it can thereafter be applied regularly to the curved face S1 of the lens 10.

In a second stage (FIG. 6b), the lens 10 is moved towards the structure 20 by creating a reduced pressure between them, inside the enclosure 100. The piston 14 rises as a gas initially present in the enclosure 100 is aspirated via the orifice 16. Aspiration is stopped when point contact is achieved between the structure 20 and the face S1 of the lens 10. The height of the piston 14 is then fixed by means of the locking system 17.

Finally, in a third stage (FIG. 6c), the buffer pad 201 is lowered again, pressing it onto the structure 20, on the side of the latter opposite the lens 10. This presses the structure 20 against the whole of the face S1 of the lens 10, with the bonding agent layer 5 clamped between them. The end of the buffer pad 201 is preferably made of a deformable and flexible material, to obtain regular application of the structure 20 to the whole of the lens 10. The structure 20 is then pushed against the whole of the face S1 by the buffer pad 201.

The ring 11 is then released and the buffer pad 201 raised. The lens 10 is removed from the device with the structure 20 stuck to its anterior face S1. The fabrication of the ophthalmic lens can then be completed in the same way as before.

It is understood that although the invention has been described in detail for application of the structure to the convex anterior surface of an ophthalmic lens, it can be applied in a similar way to the concave posterior face, by adapting the pneumatic overpressures or reduced pressures that are created in the enclosure 100. Furthermore, many other adaptations of the invention can be effected, in relation either to the composition of the structure that initially incorporates the functional film or the applicator device used.

The invention claimed is:

1. Method of sticking a functional film having a substantially planar initial shape onto a curved face of a substrate, characterized in that it comprises:

deforming the functional film, and during the deformation of said functional film, said functional film is retained on one face of a deformable auxiliary membrane by connecting means adapted so that the shape of the functional film varies in accordance with deformation of the deformable auxillary membrane, the functional film remaining parallel to deformable auxillary membrane, only the deformable auxillary membrane being held by mechanical means at its perimeter, the functional film being held in contact with said deformable auxillary membrane only by said connecting means, and the connecting means are further adapted so that portions of the functional film can move locally relative to and parallel to the deformable auxillary membrane during the deformation step; and applying the functional film onto the substrate with a portion of a bonding agent between said functional film and the substrate, so that the functional film is stuck to the substrate, wherein the connecting means comprises a capillary liquid layer or a visco-elastic adhesive material layer.

2. Method according to claim 1, in which portions of the functional film relative to the deformable auxiliary membrane can move freely during the deformation step, with no external action on said functional film or said membrane.

3. Method according to claim 1, in which the connecting means comprises a liquid with a boiling point thereof which is higher than the temperature at which said method is carried out.

4. Method according to claim 3, in which the connecting means is an oil.

5. Method according to claim 1, in which the connecting means is a visco-elastic adhesive material layer comprising a pressure-sensitive adhesive material.

6. Method according to claim 1, in which the deformable auxillary membrane is larger than the functional film so that a peripheral edge of said functional film (D) is inside a peripheral edge of said deformable auxillary membrane (E) during the deformation step.

7. Method according to claim 6, wherein the deformable auxillary membrane is of circular geometry with a membrane diameter greater than a greatest dimension of the functional film.

8. Method according to claim 1, in which the deformable auxillary membrane has a mechanical strength with respect to the deformation greater than the mechanical strength of the functional film with respect to said deformation.

9. Method according to claim 8, in which the deformable auxillary membrane has a product of Young's modulus by thickness that is greater than the product of Young's modulus by thickness of the functional film.

10. Method according to claim 1, in which the deformable auxillary membrane consists of a single homogeneous layer of a material chosen from polycarbonate, polymethylmethacrylate and polyethylene terephthalate.

11. Method according to claim 1, in which the deformable auxillary membrane is deformed by creating a pneumatic pressure difference between two faces of said membrane, one of said faces of the membrane carrying the functional film.

12. Method according to claim 1, in which the deformable auxillary membrane is deformed by pressing a buffer pad against said membrane on a side opposite the functional film.

13. Method according to claim 1, in which the connecting means comprises an intermediate film which is fixed relative to the functional film during the deformation step, portions of said intermediate film being then able to move locally relative to and parallel to the deformable auxillary membrane, said intermediate film being adapted to allow separation after the deformation step, of the deformable auxillary membrane on the one hand from an assembly comprising the functional film and the intermediate film on the other hand.

14. Method according to claim 13, in which the intermediate film is further adapted to be separated from the functional film by peeling.

15. Method according to claim 1, in which the functional film comprises a base film, the base film on its own having at least one function chosen from a function of protection against photodegradation or photo-oxidation, an anti-impact function, an anti-scratching function, an anti-reflective function, a polarizing function, a colour filter function, a photochromic function, an anti-static function, an anti-soiling function, a function provided by a complex pixellated or microstructured structure.

16. Method according to claim 1, in which the functional film comprises at least one cellular structure comprising cells juxtaposed parallel to a face of said functional film.

17. Method according to claim 1, in which said deformation step is included in a step of preforming the functional film executed before applying said functional film onto the substrate.

18. Method according to claim 1, in which the substrate comprises an ophthalmic lens intended to be assembled into an eyeglass frame.

19. Method according to claim 18, in which the functional film is cut substantially to the measurements of a lens housing of the frame before the deformation step.

20. Method according to claim 1, in which the functional film comprises a base film and at least one functional layer carried by said base film, the base film in combination with the functional layer having at least one function chosen from a function of protection against photodegradation or photo-oxidation, an anti-impact function, an anti-scratching function, an anti-reflective function, a polarizing function, a colour filter function, a photochromic function, an anti-static function, an anti-soiling function, a function provided by a complex pixellated or microstructured structure.

* * * * *